United States Patent [19]

Scruggs

[11] Patent Number: 4,555,186

[45] Date of Patent: Nov. 26, 1985

[54] AMORPHOUS ALLOY PLAIN BEARINGS

[75] Inventor: David M. Scruggs, San Juan Capistrano, Calif.

[73] Assignee: Dresser Industries, Inc., Dallas, Tex.

[21] Appl. No.: 578,895

[22] Filed: Feb. 10, 1984

[51] Int. Cl.$^4$ ............................................. E21B 9/08
[52] U.S. Cl. ...................................... 384/93; 384/92; 384/912; 428/591; 428/687; 148/403
[58] Field of Search .................. 428/591, 687; 384/93, 384/92; 308/DIG. 8; 148/403; 75/123 B, 123 J, 123 R

[56] References Cited

U.S. PATENT DOCUMENTS 4,133,679 1/1979 Ray .................................. 75/123 B
4,133,682 1/1979 Ray .................................. 75/123 B
4,167,219 9/1979 McQueen ............................. 384/93

FOREIGN PATENT DOCUMENTS 2260696 10/1975 France ............................. 123/193 P
WO82/01896 6/1982 PCT Int'l Appl. ................. 428/587

OTHER PUBLICATIONS

American Society of Metals, *Metallic Glasses*, 1978, p. 31.

Primary Examiner—L. Dewayne Rutledge
Assistant Examiner—Deborah Yee
Attorney, Agent, or Firm—Fred A. Winans

[57] ABSTRACT

A plain bearing pair comprising a bearing surface in opposed mating engagement with a relatively moveable friction bearing surface wherein the material of at least one of the mating bearing surfaces is formed from an amorphous metal alloy having a predominant refractory metal component and a Vickers Hardness Number in excess of 1000.

15 Claims, 2 Drawing Figures

AMORPHOUS ALLOY PLAIN BEARINGS

BACKGROUND OF THE INVENTION

1. Field of the Invention.

This invention relates to plain bearing structures and more particularly to heavily loaded, low speed plain bearings such as, for instance, the journal bearings of rolling cone rock bits. However, it is to be understood that the plain bearing structures of the present invention can be used in other applications for slowly moving highly loaded plain bearings wherein its advantages may be exploited.

2. Description of the Prior Art

Bearings, particularly relatively slowly moving plain bearings having a high unit loading such as in heavy duty machinery applications or in rotating cutter earth boring applications such as rolling cone rock bits, depend for the most part on boundary layer lubrication. In such applications, the unit loading is such that the opposed bearing surfaces become in intimate metal-to-metal contact over extended periods of usage. The frictional heat generated by the bearing surfaces in such instances can be sufficient to cause certain areas or points, particularly the asperities in the bearing interfaces, to become momentarily welded to the opposed surface; however, the driving forces are normally such that the weldment is immediately broken. Once such welding and breaking-away of the bearing surfaces starts, it causes further rough surfaces on the bearing pair which in turn cause further hot spots, again resulting in momentary welding and breaking-away. This is commonly referred to as galling and, once it begins, leads to rapid failure of friction or plain bearing systems.

Further, plain bearing surfaces are typically subjected to metal debris originating from the metal of the bearings themselves, or debris introduced during manufacturing process, or external debris that infiltrates into the bearing system. Such debris often scores and roughens the bearing surfaces, increasing the frictional forces and leading to premature bearing failure. This is especially true if the debris is formed of metal from the bearing surfaces which, as it is continuously circulated in the lubrication, becomes work hardened or oxidized to the extent that it becomes harder than either of the opposed engaged bearing surfaces causing rapid degradation of the surfaces and destruction of the bearing system.

To limit such various failure modes, good bearing material or composites must satisfy two conflicting requirements: (1) satisfactory compressive and fatigue strength to resist externally applied loads; and, (2) relatively soft and low melting point to permit the material to wear and conform to slight irregularities and to absorb debris. Resistance to wear and the coefficient of friction are further considerations of primary importance relating to bearing life. These considerations ultimately require a compromise in selecting bearing material for each specific application.

In the plain bearing systems of rolling cone rock bits, it is common to make the mating bearing surfaces of dissimilar but compatible metals in order to obtain mating pairs having high strength, hardness, low friction, and low-wear characteristics. For the most part, for rock bits, this has taken the form of a hardfacing or hard pad material such as complex tungsten carbide or stellite deposited on the loaded side of the journal with the opposed mating bearing surface of the cone formed of a composite material of bearing metals such as carburized steel coated with or interspersed with anti-galling metals as is well known in the art such as shown for instance in U.S. Pat. No. 3,984,158.

The hard metal or carbide pad has a high resistance to wear and damage from abrasive particles or debris; however, it is quite brittle and difficult to machine and thus, a hard metal or carbide pad cannot be paired with a mating hard metal or carbide bearing surface as such structure does not readily redistribute local stresses over a larger contact area. Further, its brittleness decreases the impact strength of a bearing having a carbide pad or surface. Also, the coefficient of thermal expansion of the carbide pad at elevated temperatures is considerably less than steel, requiring careful design considerations for attaching or forming the carbide onto a steel shaft or housing. And finally, the modulus of elasticity of carbide is on the order of two times that of steel, thereby causing the carbide material to reach its yield point at a lesser strain than the underlying steel.

It is also common to provide a hard case such as by carburizing or a surface treating method to other bearing surfaces of a journal bearing rock bit but always taking care that such treatment carefully blends into the base material and does not cause the bearing structure to lose its toughness.

Thus, it can be appreciated that in order to obtain acceptable characteristics for a plain bearing utilizing a complex tungsten carbide hardfacing or, utilizing carburizing or surface-treating the bearing surfaces, it is necessary to pair such hard, wear resistant surface with another generally less hard, conformable surface having wear or abrasion resistance but exhibiting the necessary toughness and the ability, through its conformability, to increase the area of the effective loaded surface of the bearing pair.

Thus, it is apparent, in slow speed, highly loaded boundary lubricated plain bearings, it is desirable to provide matched opposed bearing surfaces having a sufficiently low coefficient of friction that momentary frictional heat does not cause weldment or galling or lubricant deterioration and yet is extremely tough and wear-resistant to withstand the high-unit loadings without being brittle and generally having a modulus of elasticity commensurate with the base metal of the shaft or housing.

In commonly assigned co-pending U.S. application Ser. No. 503174 filed 6-10-83, it is taught to fabricate wear resistant surfaces of amorphous metal alloys having a Vickers Hardness Number (VHN) of at least 1600, with such alloys providing excellent wear characteristics. Also, it has been recognized that amorphous metal alloys generally have several properties such as shear strength, impact strength, corrosion resistance, stiffness and ductility that make them attractive for plain bearing considerations. In this regard recent investigations were conducted on the wear properties of certain amorphous metals, primarily titanium based metallic glasses (See "Final Report on Government Contract #DAAG 29-78-G-0137 and #DAAG 29-80-C-0147") and ferrous based metallic glasses in sliding contact with aluminum oxide (See "Technical Paper on Sliding Induced Crystallization of Metallic Glass" Report #NASATP2140, Mar. 1983). A general observation in the first above-identified report was that the wear of all metallic glasses studied was characterized by higher wear rates, as compared to crystalline alloys containing these elements.

According to the second-identified report, the results indicated that the studied amorphous alloys can be crystallized during sliding contact, with such crystallization of the wear surfaces causing high friction. The metallic glass (i.e. amorphous alloy) of the second report had a microhardness (Vickers) of 980.

Thus, such studies would indicate that either because of unsatisfactory wear rate or concerns with crystallization, amorphous alloys are not suitable for use in heavily loaded boundary lubricated plain bearing applications.

SUMMARY OF THE PRESENT INVENTION

Contrary to the above general observation with respect to certain amorphous metals, the present invention contemplates that amorphous metal alloys, particularly those of the compositions disclosed in the previously identified commonly assigned co-pending application wherein the predominant component is a refractory metal such as W, Nb, Ru, or Mo, and particularly such amorphous alloys having a VHN greater than about 1000 and a crystallization termperature greater than 600° C., have certain characteristics that make them uniquely suitable for plain bearing components either forming the bearing components or deposited on surfaces of heavily loaded slow speed plain bearings such as the journal and thrust bearing surfaces of a rolling cone rock bit.

Such amorphous metal alloys, having a VHN of at least 1000, are approximately twice as hard as the complex tungsten carbide hard pad presently employed in a rock bit journal bearing (i.e. 580 VHN), and therefore have the low-wear qualities of a good bearing material but have a modulus of elasticity commensurate with the modulus of the base material on which they are deposited, for transmitting stress loads and sudden impact loads therethrough without cracking and therefore capable of distributing the load. Such amorphous metal alloys would also have a sufficiently high temperature of crystallization such that they are eminently less likely to reform into micro-crystalline metal even under such extreme operating conditions.

As amorphous metal alloys also typically exhibit a relatively low coefficient of friction it is within this invention to form both the opposed bearing surfaces of such amorphous metal alloys as above defined without causing a frictional heat buildup that would otherwise result in galling or crystallization or both. Also, in that such amorphous metal alloys are extremely hard, any metal debris within the bearing system, particularly if included in the lubricant, would likely be less hard and unable to score or gouge the hard bearing surface and yet such bearing surface would have a load bearing capability and modulus of elasticity closely analogous to the underlying shaft or housing metal.

It is thus within the ambit of the present invention to form a plain bearing system having at least one of the opposed relatively moveable bearing surfaces, such as the journal or thrust surfaces on the bearing of a rock bit, formed of an amorphous metal having a predominant refractory metal component and a VHN of at least 1000 and a crystallization temperature of at least 600° C. It is also contemplated within the invention to have both plain bearing surfaces formed of the same or a different amorphous metal alloy but with each having the aforementioned properties.

DESCRIPTION OF THE PREFERRED EMBODIMENT

Figure 1:
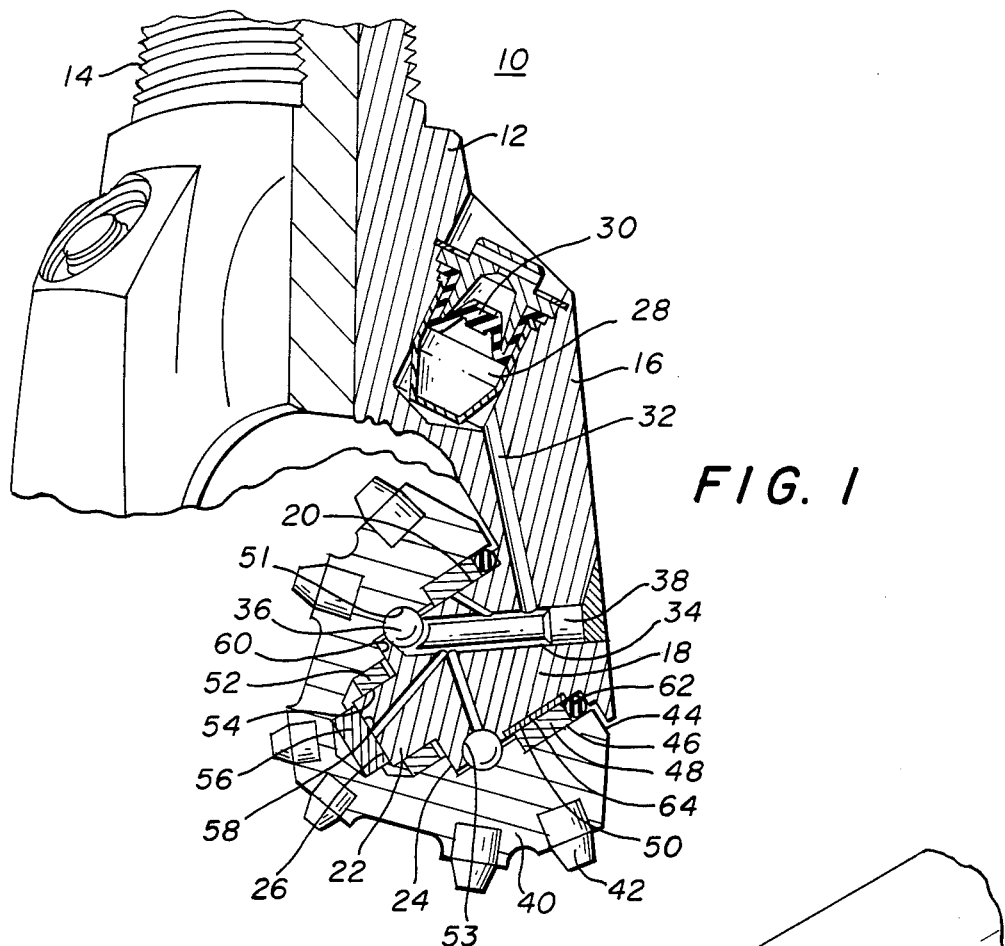
FIG. 1 is a cross-sectional elevational view of one leg of a rolling cone rock bit showing various plain bearing surfaces.

The hereinafter described invention of utilizing amorphous metal alloys having a predominant refractory metal component and a Vickers Hardness Number greater than 1000, with a crystallization termperature greater than 600° C. as either bearing component of a bearing pair or integrally attached to the surface of individual bearing components for forming highly-loaded boundary lubricated plain bearings, is best illustrated with reference to a journal bearing rotary rock bit such as shown in FIG. 1 which is typical of a rock bit as manufactured by the corporate assignee of the present invention. Referring to FIG. 1, the rock bit 10 is seen to comprise a body portion 12 threaded at one end 14 for attachment to a drill string and having, at the opposite end, generally three legs (only one leg 16 being shown). Each leg, terminates in a downwardly inwardly directed pin or journal member 18 having a generally stepped concentric cylindrical configuration, with the largest diameter cylindrical surface 20 forming the main journal bearing portion and a lesser diameter cylindrical surface 22 forming a secondary journal bearing. The shoulder 24, generally radially extending between the two bearing surfaces 20 and 22, and the radially extending terminal end 26 of the pin 18 define thrust bearing surfaces on the pin.

A sealed lubricant reservoir 28 is housed in the upper portion of the leg 16 and includes a flexible diaphragm 30 in communication with the ambient conditions of the bit. Lubricant passages 32 extend through the leg 16 and pin 18, terminating at bearing surfaces 20 and 26 to provide lubrication to these surfaces during operation of the bit. Also, the pin 18 and leg 16 include a ball passage 34 therethrough for inserting locking ball members 36, as is well known in the art. Passage 34 also forms a part of the lubricant distribution passage as it is incompletely filled by a ball plug member 38 that is subsequently welded therein.

A cutter member 40 is rotatably mounted on the journal 18 and generally defines a conical structure having an exterior surface on which is mounted a plurality of outwardly projecting cutter elements 42. Extending inwardly from the base 44 of the cutter member is a bearing cavity 46 of like axially concentric cylindrical stepped configuration with the journal 18. As is seen in FIG. 1, the cavity wall initially supports a bushing 48, generally press fit into the cutter 40 and defining a surface 50 in load bearing engagement with surface 20 of the pin 18. The cutter 40 also defines an annular race 51 for the locking balls 36, which in conjunction with an opposed race 53 on the pin 18 confine the balls between the cutter and the pin and retain the cutter thereon. The cutter cavity also retains a nose bushing 52, likewise pressed therein and again defining a surface 54 in load bearing engagement with the surface 22 of the reduced diameter portion of the pin 18. Finally, a nose thrust button 56 is pressed into the terminal end of the cavity and defines a surface 58 in thrust bearing engagement with the terminal surface 26 of the pin 18. A radially extending shoulder 60 is likewise in thrust bearing engagement with the radially extending shoulder 24 of the pin. A resilient sealing member 62 compressed between the cone cavity and pin 18 generally adjacent the base of the cutter seals the bearing cavity from the exterior conditions surrounding the bit 10.

The above structure is well known in the rock bit art as is the fact that during operation, as the bit rotates, the cutter 40 engages the bottom of the borehole and rotates about the pin 18. The weight on the bit is transmitted to the bottom of the borehole through the lower surface of the main journal bearing 20 and secondary journal bearing 22 and through the thrust bearing surfaces 24,26; with the upper surfaces of the respective journal bearings generally not receiving any bearing load. Under such highly loaded conditions normally encountered by the drill bit, both the lower portion of the journal and thrust bearing engaging surfaces abovedescribed operate within the thin film boundary lubricated range.

In accordance with the present invention, it is contemplated that at least the lower load bearing engaging surfaces of the main and secondary journal bearing areas 20 and 22 of the pin 18 and the thrust loaded bearing surfaces of the pin are coated with or have attached thereto a layer of an amorphous metal having a predominant refractory metal component and a Vickers Hardness Number in the range of 1000 or greater. As seen in FIG. 1, the lower portion of the main journal bearing 20 has a portion of the base metal removed and is filled back to a cylindrical surface with a deposit or insert 64 of such material as this surface is subject to the greatest wear. The material could be applied in a similar manner to the other plain bearing surfaces; however, as shown, the amorphous metal is applied as a very thin surface layer bonded to and made integral with the base metal. The mating load bearing element, in this embodiment, is fabricated from any well known composite bearing structure such as the silver impregnated sintered bushing shown in commonly owned U.S. Pat. No. 3984158. With such construction, the amorphous metal alloy has all the attributes making it desirable for a bearing component such as a high hardness, ductility, wearability, and modulus of elasticity generally commensurate with the metal of which the pin is formed. The opposed bushing 48 provides intermittent anti-galling (i.e. silver) material which is generally conformable to the engaged surfaces to spread the load and also sufficiently soft to accept, for embedding therein, debris particles without scoring through recirculation the bearing surfaces so that when metal-to-metal contact occurs in such boundary lubricated bearings, there is insufficient frictional heat developed to cause the bearing temperature to reach the 600° C. minimum. crystalization temperature of the particular amorphous alloys.

Figure 2:
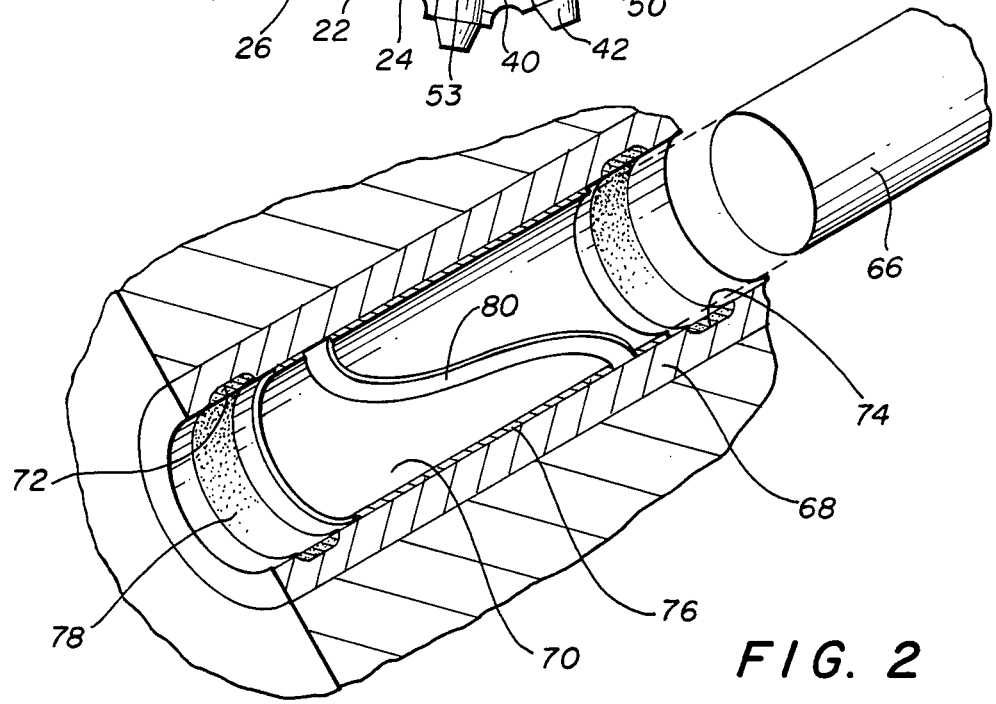
FIG. 2 is an axial cross-sectional view of a plain bearing with both bearing surfaces formed of an amorphous alloy.

Reference is now made to FIG. 2 to show a plain journal bearing construction wherein both the journal and the opposed bushing are formed of or coated with such an amorphous metal alloy having the properties previously described. As therein seen, the journal 66 is a cylindrical member either formed from or having an amorphous metal alloy coating thereon. The journal is received within a bushing 68 having an internal load engaging surface 70 for bearing engagement therebetween. The bushing 68 has annular grooves 72, 74 adjacent each end thereof. An amorphous metal alloy 76 is deposited between the grooves and forms the bearing surface 70. The grooves are filled with an anti-galling metal such as silver 78. The amorphous alloy 76 forming the load bearing portion 70 also contains a generally axially extending groove 80 which is likewise filled with a lubricant or anti-galling material. Thus, upon assembly of the journal 66 within the bushing 68, the journal load is transmitted through the co-engaged amorphous alloy bearing surfaces and, as lubricant flows therebetween, debris would be generally trapped upon its entrance or exit within the anti-galling metal 78 of the axially disposed grooves 72, 74. Further, lubricant or anti-galling material is deposited between the amorphous metal bearing surfaces 66, 70 from the groove 80 as the bushing rotates relative to the journal. Thus, in this embodiment, wherein both surfaces are extremely hard and incapable of embedding therein any debris, the debris is accommodated by being trapped within the axial grooves 72, 74 and the surfaces are otherwise lubricated by lubricant from an axially extending groove 80.

In either of the bearing embodiments as abovedefined, that surface which is coated with the amorphous alloy or formed of the amorphous alloy will not be marred or scored by any of the debris as the debris will, in all instances, be softer than the amorphous alloy surface. However, it is necessary to minimize the debris between the bearing surfaces as such debris would tend to increase the frictional drag which may cause sufficient heat to be generated that would exceed the crystalization temperature of the amorphous alloy. Therefore, in both configurations, structure is provided to accommodate and remove from continuous recirculation, the debris from between the bearing surfaces.

The following table sets forth examples of several amorphous materials, which have a predominant refractory metal component such as W, Nb, Ru, Mo resulting in a VHN greater than 1000. All of these identified amorphous metals also have a crystallization temperature in excess of 600° C. with the least being about 650° C. (crystallization temperature for W bal, 20 Co, 2.0 B). Such amorphous alloys are contemplated as being therefore particularly suitable for plain bearing surfaces. However, these examples are not intended to limit the invention, but instead are presented as illustrative of materials within the scope of the invention:

| Composition | VHN |
| --- | --- |
| W bal, 20 Co, 2.0 B | 1250 |
| Mo bal, 40 Ru, 2.4 B | 1400 |
| W bal, 12.7 Fe, 15.4 Ru, 2.1 B | 1450 |
| W bal, 25 Ru, 23 Fe, 4 Ni, 3.3 B | 1580 |
| W bal, 44 Ru, 2.5 B | 1600 |
| Co bal, 38.4 Nb, 5.0 B | 1650 |
| Mo bal, 40 Ru, 3.35 B | 1660 |
| W bal, 26.3 Co, 15.6 Ru 4.1 B | 1665 |
| Re bal, 33.4 Mo, 1.65 B | 1700 |
| Mo bal, 40 Ru, 3.0 B | 1650 |
| W bal, 34.8 Ru, 1.86 B | 1700 |
| W bal, 26.5 Ru, 1.76 B | 1800 |
| Co bal, 38 Nb, 6.0 B | 1850 |

(All compositions in weight percent, as are all compositions set forth herein. "bal" indicates that the balance of the material is the specified element, so that the percentages total 100.)

To achieve the ability to operate as a bearing material within a plain bearing in a boundary layer lubricated condition with very little wear and acceptable amorphous stability, the amorphous materials must have a hardness greater than about 1000 VHN and a crystallization temperature in excess of 600° C. Certain classes of amorphous materials have been found to have such high hardnesses and high crystallization temperatures. These include metal-metalloid amorphous alloy materials such as W, Nb, Ru, or Mo, wherein a refractory metal is a predominant component (by this is meant the refractory metal must contribute predominately to the metal bonding and, in all cases, must comprise at least 30% by weight of the alloy). A metal-metalloid amorphous material is formed by rapidly cooling a melt of the proper proportions of one or more metals and one or more metalloids such as B, C, P, or Si. One example of a suitable metal-metalloid material is compositions within the range W bal, 26-35 Ru, 1.8-3.4 B. Amorphous materials in this composition range have hardnesses near or above about 1600 VHN, and have good bend ductilities, and a crystallization temperature in excess of 600° C. Molybdenum or niobium may be substituted in whole or in part for the tungsten at higher levels of metalloid and iron or cobalt may be substituted in whole or in part for ruthenium.

Substitution of more abundant materials can be made for some of the rare materials listed above, while retaining the necessary hardness of above 1000 VHN and the ability to achieve the amorphous state upon solidification. For example, iron may be substituted for some of the ruthenium in the W-Ru-B material. Further, it is believed that other metalloids such as P, C, or Si could be substituted in part for the B in the W-Ru-B or W-Ru-Fe-B alloys.

Another metal-metalloid material having the necessary characteristics is Co bal, 38 Nb, 5 B. As with the case of W-Ru-B, it is believed that other elements may be substituted for the Nb, Co and B in whole or in part, while retaining the necessary hardness. Niobium is an early transition metal, and it is believed that other early transition metals such as Ti, V and Zr may be substituted in whole or in part for the Nb in the Nb-Co-B alloy. Similarly, Co is a late transition metal, and it is believed that other late transition metals such as Fe or Ni may be substituted in whole or in part for the Co. And, it is believed that other metalloids such as P, Si or C may be substituted in part for the B. Further, as with the addition of Fe to the W-Ru-B material, it is believed that minor amounts of other elements may be substituted for the Nb or Co, while retaining the amorphous character and hardness greater than about 1000 VHN and crystallization temperature exceeds 600° C.

Depending upon the fabrication technique, a particular alloy may be entirely amorphous or only partly amorphous. It is understood that both fully and partially amorphous materials are within the scope of the present invention, as long as the hardness of the amorphous portion exceeds about 1000 VHN and crystallization temperature exceeds 600° C.

In employing other amorphous materials in accordance with the present invention, various combinations of constituents may be utilized. However, whatever the precise composition, the amorphous portion of the constituents forming the bearing surface must have a hardness of greater than about 1000 VHN.

It will now be appreciated that this invention provides a plain bearing utilizing amorphous metal alloy material having a predominant refractory metal constituent that provides significant advantages. Such amorphous materials have hardnesses greater than about 1000 VHN and a crystallization temperature in excess of 600° C., which in combination, provides a wear resistance significantly greater than that of other lower VHN amorphous materials and of commonly used non-amorphous materials and the ability to retain the amorphous qualities and characteristics in film lubricated plain bearing applications. Further, such amorphous materials are fabricable into surface-protective materials with good strength, ductility, and corrosion resistance. Further such material has a sufficiently low coefficient of friction and elevated crystallization temperature that heat developed in the bearing is insufficient to initiate galling.

Although a particular embodiment of the invention is described in detail for purposes of illustration, various embodiments may be made without departing from the spirit and the scope of the invention. Accordingly, the invention is not to be limited except as by the appended claims.

I claim:

1. A boundary lubricated plain bearing pair comprising relatively moveable bearing surfaces in opposed load bearing sliding engagement through a thin film of lubricant wherein at least one of said bearing surfaces is formed of an amorphous alloy having as an essential component a refractory metal and having a VHN of at least 1000 and a crystallization temperature above 600° C.

2. Bearing structure according to claim 1 wherein the opposed bearing surface is a composite bearing surface including an anti-galling metal forming a part thereof.

3. Bearing structure according to claim 1 wherein the opposed bearing surface is likewise formed of an amorphous alloy having as an essential component a refractory metal and a VHN of at least 1000 and a crystallization temperature of above 600° C.

4. Bearing structure according to claim 3 wherein said essential refractory metal component comprises a predominant constituent of said amorphous alloy of either surface.

5. Bearing structure according to claim 4 wherein said refractory metal component includes any of W, Nb, Ru or Mo.

6. Bearing structure according to claim 3 wherein one of said opposed bearing surfaces has a lubricant spreading depression extending generally across the engaged bearing surfaces.

7. Bearing structure according to claim 6 wherein said plain bearing is a journal and bushing in relatively rotary motion on an axis and wherein an axial extent of said bushing has a bearing surface of amorphous metal alloy and said bushing further defines an annular layer of anti-galling metal adjacent each axial end of said amorphous metal surface.

8. Bearing structure according to claim 7 wherein said lubricant spreading depression includes a groove extending generally across the axial extent of said amorphous metal surface in said bushing.

9. Improved bearing means for a rotary cone journal bearing rock bit comprising a journal extending from a drill bit body and having a journal bearing surface and a thrust bearing surface formed thereon; a cutter cone rotatably mounted on said journal and having a bearing cavity defining bearing surfaces that oppose and engage the bearing surfaces on said journal in boundary lubricated bearing engagement, said improvement comprising at least said journal bearing surface on said journal being formed of an amorphous alloy having as an essential component a refractory metal and having a VHN of at least 1000 and a crystallization temperature above 600° C.

10. Structure according to claim 9 wherein said essential refractory metal component comprises a predominant constituent of said amorphous alloy.

11. Structure according to claim 10 wherein said refractory metal component includes any of W, Nb, Ru, or Mo.

12. Structure according to claim 9 wherein said amorphous alloy is attached to and forms a part of the lower arcuate circumference of the journal to provide a load bearing surface for engaging said bearing cavity of said cone.

13. Structure according to claim 12 wherein said thrust bearing surface on said journal is also formed of an amorphous alloy having as a predominant component a refractory metal and a VHN of at least 1000 and a crystallization temperature of above 600° C.

14. Structure according to claim 12 wherein said surface of said bearing cavity in cone bearing engagement with said amorphous alloy surface of said lower arcuate circumference of said journal is also formed of an amorphous alloy having as an essential component a refractory metal and having a VHN of at least 1000 and a crystallization temperature above 600° C.

15. Structure according to claim 13 wherein the surfaces of said bearing cavity in said cone in thrust bearing engagement with said amorphous alloy bearing surface of said journal are also formed of an amorphous alloy having as a predominant component a refractory metal and a VHN of at least 1000 and a crystallization temperature of above 600° C.

* * * * *